(12) United States Patent
Tortonese et al.

(10) Patent No.: US 6,646,737 B2
(45) Date of Patent: Nov. 11, 2003

(54) SUBMICRON DIMENSIONAL CALIBRATION STANDARDS AND METHODS OF MANUFACTURE AND USE

(75) Inventors: Marco Tortonese, Mountain View, CA (US); Ian Smith, Los Gatos, CA (US); Ellen Laird, San Jose, CA (US); Bradley W. Scheer, San Jose, CA (US)

(73) Assignee: KLA-Tencor Technologies, Milpitas, CA (US)

( * ) Notice: Subject to any disclaimer, the term of this patent is extended or adjusted under 35 U.S.C. 154(b) by 205 days.

(21) Appl. No.: 09/961,629

(22) Filed: Sep. 24, 2001

(65) Prior Publication Data

US 2003/0058437 A1 Mar. 27, 2003

(51) Int. Cl.[7] .............................................. G01R 31/26
(52) U.S. Cl. .............................. 356/243.4; 356/243.1; 438/14
(58) Field of Search ...................... 73/865.8; 356/243.4, 356/243.1, 399–401; 438/14, 406

(56) References Cited

U.S. PATENT DOCUMENTS

| | | |
|---|---|---|
| 5,534,359 A | 7/1996 | Bartha et al. |
| 5,665,905 A | 9/1997 | Bartha et al. |
| 5,684,301 A | 11/1997 | Cresswell et al. |
| 5,914,784 A | 6/1999 | Ausschnitt et al. |
| 5,920,067 A | 7/1999 | Cresswell et al. |
| 5,955,654 A | 9/1999 | Stover et al. |
| 5,960,255 A | 9/1999 | Bartha et al. |
| 5,969,273 A | 10/1999 | Archie et al. |
| 6,016,684 A | 1/2000 | Scheer et al. |
| 6,128,089 A | 10/2000 | Ausschnitt et al. |

OTHER PUBLICATIONS

US 5,841,144, 11/1998, Cresswell (withdrawn)
Tompkins, *A User's Guide to Ellipsometry*, © 1993 Academic Press, Inc., pp. 1–260.

Potzick, "Antireflecting–Chromium Linewidth Standard, SRM 473, for Calibration of Optical Microscope Linewidth Measuring System," 1997, abstract only.

Allen et al., "Evaluation of Surface Depletion Effects in Single–Crystal Test Structures for Reference Materials Applications," 1998, pp. 357–362.

Allen et al., "Sheet and Line Resistance of Patterned SOI Surface Film CD Reference Materials as a Function of Substrate Bias," 1999, pp. 51–55.

Cresswell et al., "Electrical Linewidth Test Structures Fabricated in Monocrystalline Films for Reference–Material Applications," 1998, pp. 182–193.

Allen et al., "Comparison of Properties of Electrical Test Structures Patterned in BESOI and SIMOX Films for CD Reference–Material Applications," 1998, pp. 124–131.

*Primary Examiner*—Russell Adams
*Assistant Examiner*—Michael Dalakis
(74) *Attorney, Agent, or Firm*—Ann Marie Mewherter; Conley Rose P.C.

(57) ABSTRACT

A calibration standard which may be used to calibrate lateral dimensional measurement systems is provided. The calibration standard may include a first substrate spaced from a second substrate. In addition, the calibration standard may include at least one layer disposed between the first and second substrates. The layer may have a traceably measured thickness. For example, a thickness of the layer may be traceably measured using any measurement technique in which a measurement system may be calibrated with a standard reference material traceable to a national testing authority. The calibration standard may be cross-sectioned in a direction substantially perpendicular to an upper surface of the first substrate. The cross-sectioned portion of the calibration standard may form a viewing surface of the calibration standard. In this manner, a lateral dimensional artifact of the calibration standard may include the traceably measured thickness of at least the one layer.

49 Claims, 4 Drawing Sheets

US 6,646,737 B2

SUBMICRON DIMENSIONAL CALIBRATION STANDARDS AND METHODS OF MANUFACTURE AND USE

BACKGROUND OF THE INVENTION

1. Field of the Invention

This invention generally relates to submicron dimensional calibration standards and methods of manufacture and use. Certain embodiments relate to calibration standards having a traceably measured submicron lateral dimension that may be smaller than lateral dimensions of features which may be formed with current lithography equipment.

2. Description of the Related Art

As the dimensions of semiconductor devices continue to shrink with advances in semiconductor materials and fabrication processes, monitoring and controlling semiconductor fabrication processes by lateral dimensional metrology has become increasingly important in the successful fabrication of advanced semiconductor devices. Currently available systems which may be used for lateral dimensional metrology may include systems configured to perform a technique such as optical, electron beam, ion beam, atomic force, and scanning probe microscopy. In addition, lateral dimensional metrology systems may also include systems configured to perform an electrical metrology technique. For example, an electrical metrology technique may involve measuring resistance of a feature of a known material and determining a cross-sectional area and/or a linewidth of the feature from the measured resistance.

A calibration standard may be used to calibrate lateral dimensional metrology systems as described above. A calibration standard may include features such as lines and/or spaces having a certified lateral dimension. Currently available linewidth calibration standards may have a lateral dimension artifact of approximately 500 nm to approximately 30,000 nm. For example, such calibrations standards may typically be formed by semiconductor fabrication processes such as lithography and etch. Such lithography and etch processes may produce features having a lateral dimension of greater than approximately 180 nm. As such, a minimum lateral dimension of calibration standards formed by current lithography and etch processes may be limited by a performance capability of such processes and systems. In this manner, lateral dimensional metrology equipment may be calibrated at a minimum lateral dimension which may be substantially greater than a lateral dimension of features formed by advanced semiconductor fabrication processes. Lateral dimensional metrology equipment, therefore, may have limited usefulness for monitoring and controlling advanced semiconductor fabrication processes.

Several calibration methods for lateral dimensional metrology equipment, however, have been developed for use with currently available calibration standards to expand the usefulness of lateral dimensional metrology equipment for advanced processing applications. Examples of methods for expanding the usefulness of lateral dimensional metrology equipment for advanced semiconductor fabrication process applications are illustrated in U.S. Pat. Nos. 5,914,784 to Ausschnitt et al., 5,969,273 to Archie et al., and 6,128,089 to Ausschnitt et al., and are incorporated by reference as if fully set forth herein. Such methods, however, may include indirectly determining a location of an edge of a feature. Therefore, lateral dimensional calibration and measurement using such methods may be subject to substantial inaccuracy.

An example of a calibration standard may include conductive features formed on a insulating layer. For example, a silicon dioxide insulating layer may be formed below the surface of a monocrystalline silicon substrate using an implantation process which may be commonly referred to as "Separation by the Implantation of Oxygen," or "SIMOX." The insulating layer may be annealed to form an amorphous layer of insulating silicon dioxide within the monocrystalline silicon substrate. The monocrystalline silicon layer above the insulating layer may have a defined crystal structure. In addition, the monocrystalline silicon layer above the insulating layer may be patterned using standard photolithography and etch techniques. In this manner, the monocrystalline silicon layer may be etched along a plane of the crystal structure to form silicon features having substantially planar sidewalls. Linewidth and line spacing of the silicon features may be measured using transmissive electron microscopy measurements and electrical measurements. Linewidth and line spacing of the silicon features may also be measured using "atomic lattice counting" techniques such as scanning probe microscopy ("SPM") because etching the monocrystalline layer along crystal planes may form a very accurate structure. Examples of such calibration standards are illustrated in U.S. Pat. Nos. 5,684,301 to Cresswell et al. and 5,920,067 to Cresswell et al., and are incorporated by reference as if fully set forth herein.

Such currently available calibration standards, however, may include opaque conductive features formed by standard lithography and etch techniques. In this manner, a lateral dimension of the opaque conductive features may be greater than or equal to a minimum lateral dimension of a feature that may be produced by currently available processes and systems. For example, opaque conductive features of such calibration standards may have a minimum lateral dimension of approximately 500 nm.

Another currently available calibration standard may include at least one pair of different structures such as a line and trench. Examples of such calibration standards are illustrated in U.S. Pat. Nos. 5,534,359 to Bartha et al., 5,665,905 to Bartha et al., and 5,960,255 to Bartha et al., and are incorporated by reference as if fully set forth herein. Such calibration standards may be used to calibrate an ultra-fine tip such as a tip which may be used for AFM or SPM. Calibration may include determining a width of the tip. A width of the tip may be determined by profiling a pair of different structures with the tip. For example, calibration of the tip may include measuring a width of a line by profiling the line with the tip. In addition, calibration of the tip may include measuring a width of a trench of the same pair of structures by profiling the trench with the tip. If the pair of structures have substantially equal lateral dimensions, then the measured widths of the line and the trench may be subtracted, and the resulting value may be divided by two to determine the exact diameter or width of the tip.

Once the exact diameter or width of the tip has been determined, the tip may be used to measure features and layers of additional samples. Therefore, it is very important that the calibration standard have at least one pair of different structures such as a line and a space which have exactly the same width. In addition, it is very important that two measurements are carried out with different structures of the same pair of structures to assure accurate calibration and subsequent accurate measurement. In this manner, knowledge of the exact dimensions of the features of the calibration standard is not necessary to calibrate the tip. Therefore, lateral dimensions of the features of the calibration standard may not be traceably measured. Traceable measurements may include measurements performed in a manner traceable to the National Institute of Standard and Technology ("NIST"). As such, the calibration standard may not be certified and may not be used to calibrate additional measurement systems such as optical microscopes, scanning electron microscopes, focused ion beam microscopes, and electrical metrology systems.

Accordingly, it would be advantageous to develop a calibration standard including at least one feature having a lateral dimension of less than approximately 500 nm which may be traceably measured, accurately certified, and relevant to a semiconductor fabrication process being monitored and controlled by a lateral dimensional metrology system calibrated with the calibration standard.

SUMMARY OF THE INVENTION

An embodiment of the invention relates to a calibration standard which may be used to calibrate lateral dimensional measurement systems. The lateral dimension of the standard may be produced and measured in a way traceable to NIST through the use of thin film deposition techniques and thin film metrology techniques. Lateral dimensional measurement systems may include, but may not be limited to, systems configured to perform a technique such as scatterometry and optical, electron beam, ion beam, atomic force, and scanning probe microscopy.

The calibration standard may include a first substrate spaced from a second substrate. In addition, the calibration standard may include at least one layer disposed between the first and second substrates. The layer may have a traceably measured thickness. For example, the traceably measured thickness may be determined by thin film metrology. The traceably measured thickness may also be determined using a traceable measurement technique such as ellipsometry, spectrophotometry, interferometry, profilometry, energy dispersive X-ray spectroscopy ("EDS"), thermal and acoustic wave techniques, cross-sectional transmission electron microscopy ("TEM") and X-ray techniques. Each of the traceable measurement techniques described above may include calibration of a measurement system with a standard reference material traceable to a national testing authority such as NIST. Appropriate traceable measurement techniques may further include any measurement technique in which a measurement system may be calibrated with a standard reference material traceable to a national testing authority. Appropriate traceable measurement techniques may also include reference to the atomic spacing in monocrystalline silicon. The traceably measured thickness may be less than approximately 500 nm, or even less than approximately 100 nm.

The first substrate, at least the one layer, and the second substrate may be cross-sectioned in a direction substantially perpendicular to an upper surface of at least the first substrate. The calibration standard may also be rotated such that a cross-sectional surface formed by the cross-sectioned portion of the calibration standard may be a viewing surface of the calibration standard. In this manner, a lateral dimensional artifact of the calibration standard may include the traceably measured thickness of at least the one layer.

The viewing surface of the calibration standard may be planarized such that the viewing surface may be substantially planar. Alternatively, the viewing surface may be substantially non-planar. For example, a portion of the first and second substrates extending from the cross-sectional surface or a portion of at least the one layer extending from the cross-sectional surface may be removed such that the viewing surface may be substantially non-planar. In addition, a portion of at least the one layer extending from the cross-sectional surface may be removed to form a trench in the calibration standard between the first and second substrates. Furthermore, a thermally grown oxide may be formed on silicon surfaces of the calibration standard such as upper surfaces of the first and second substrates and sidewall surfaces of the trench. Subsequent processing may include removing the thermally grown oxide. As such, reentrant knife-edge structures may be formed at upper corners of the trench. Alternatively, a portion of the first and second substrates extending from the cross-sectional surface may be removed such that at least the one layer may form a topographic feature of the calibration standard. In this manner, the topographic feature may be a line or another appropriate topographic feature.

In an embodiment, materials of the calibration standard may include materials used in a semiconductor fabrication process. Furthermore, a traceably measured thickness of at least one layer of the calibration standard may be approximately equal to a lateral dimension of a feature formed by the semiconductor fabrication process. The lateral dimension of a feature formed by the semiconductor fabrication process may be measured with a lateral dimensional measurement system calibrated with the calibration standard. As such, the materials of the calibration standard and the traceably measured thickness of at least the one layer may be relevant to a feature formed by the semiconductor fabrication process. In this manner, a calibration standard may be relevant to a semiconductor fabrication process that may be monitored and/or controlled by lateral dimensional metrology.

In an embodiment, a calibration standard may include at least three layers disposed between the first and second substrates. At least the three layers may form at least one lateral dimensional artifact, or feature, of a calibration standard. For example, the three layers may form a plurality of features such as two lines, two trenches, and a line and a space. In addition, the three layers may include a first feature and a second feature. A traceably measured thickness of the first feature may be approximately equal to a traceably measured thickness of the second feature. Alternatively, a traceably measured thickness of the first feature may be substantially different than a traceably measured thickness of the second feature. Furthermore, at least the three layers may include at least two features of a repetitive pitch grating. In this manner, the calibration standard may include any number of lateral dimensional artifacts or features.

An additional embodiment relates to a method for forming a calibration standard. The method may include forming at least one layer upon an upper surface of a first substrate. The method may also include determining a thickness of at least the one layer using a traceable measurement technique. Determining a thickness of at least the one layer may include calibrating a measurement system with a standard reference material traceable to a national testing authority. For example, the traceable measurement technique may include thin film metrology. The traceable measurement technique may also include, but may not be limited to, ellipsometry, spectrophotometry, interferometry, profilometry, EDS, thermal and acoustic wave techniques, cross-sectional TEM, and X-ray techniques. Each of the traceable measurement techniques described above may include calibrating a measurement system with a standard reference material traceable to a national testing authority such as NIST. The determined thickness may be less than approximately 500 nm, or even less than approximately 100 nm.

The method may include bonding a second substrate to an upper surface of at least the one layer. The method may further include cross-sectioning the first substrate, at least the one layer, and the second substrate in a plan substantially perpendicular to at least the first substrate. In this manner, cross-sectioning may form a viewing surface of the calibration standard such that a lateral dimensional artifact of the calibration standard may include the determined thickness of at least the one layer. The method may also include planarizing the cross-sectioned first substrate, at least the one layer, and second substrate such that the viewing surface may be substantially planar. In addition, the method may include removing a portion of the first substrate, at least the one layer, and the second substrate extending from the viewing surface such that the viewing surface may be substantially non-planar.

The method may also include removing a portion of the calibration standard to form at least one topographic structure of the calibration standard. For example, the method may include removing a portion of the first and second substrates extending from the viewing surface such that at least the one layer may form a topographic feature of the calibration standard such as a line. Alternatively, the method may include removing a portion of at least the one layer extending from the viewing surface to form a trench or a space in the calibrations standard. In addition, or as an alternative, to traceably measuring a thickness of at least the one layer subsequent to deposition of the layer, a thickness of the layer may be measured with a traceable measurement technique subsequent to cross-sectioning and additional processing as described herein.

In an embodiment, the method may include forming a thermally grown oxide on upper surfaces of the first and second substrates and on sidewall surfaces of a trench formed in the calibration standard. The method may include removing the thermally grown oxide to form reentrant knife-edge structures at upper corners of the trench. Alternatively, the method may include depositing a material on the thermally grown oxide. The method may also include planarizing the deposited material and the thermally grown oxide such that upper surfaces of the thermally grown oxide and the deposited material are substantially planar with upper surfaces of the first and second substrates. The method may further include determining a thickness of at least the thermally grown oxide or the deposited material using a traceable measurement technique. Furthermore, the method may include removing a portion of the thermally grown oxide and/or the deposited material to form topographic features such as trenches in the calibration standard.

An additional embodiment relates to a method for calibrating a lateral dimensional measurement system. The method may include determining a thickness of at least one layer of a calibration standard with the lateral dimensional measurement system. The calibration standard may be configured as described herein. For example, at least one layer of the calibration standard may have a traceably measured thickness. In addition, a lateral dimensional artifact of the calibration standard may include the traceably measured thickness of at least the one layer. The method may also include altering calibration factors of the measurement system if the determined lateral dimension is not substantially equal to the lateral dimensional artifact of the calibration standard.

In an embodiment, a calibration standard may include features such as lines and/or spaces. A calibration standard may also include pitch features with repetitive lines since lateral magnification calibration of a microscope may be accomplished with lower errors from line edge determination than from width measurements. Such features may have accurately characterized sidewall angles and precisely measured lateral and/or vertical dimensions. Lateral dimensions of features of the calibration standard may be measured in a manner traceable to the National Institute of Standards and Technology ("NIST") or any other competent standard authority. In addition, such features may have lateral and/or vertical dimensions which may be approximately equal to lateral and/or vertical dimensions of features formed by a semiconductor fabrication process. In this manner, features of a calibration standard may have lateral dimensions of less than approximately 250 nm. For example, features of a calibration standard may have lateral dimensions of approximately 100 nm or less. As such, lateral dimensions of a calibration standard may be relevant to lateral dimensions of features formed by processes being monitored or controlled by lateral dimensional metrology. Furthermore, a lateral dimensional artifact of the calibration standard may be smaller than a lateral dimension of a feature that may be formed by currently available lithography equipment.

BRIEF DESCRIPTION OF THE DRAWINGS

Other objects and advantages of the invention will become apparent upon reading the following detailed description and upon reference to the accompanying drawings in which.

Figure 1:
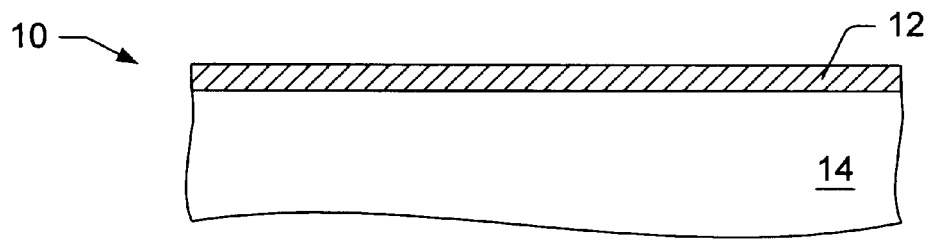
FIG. 1 depicts a partial cross-sectional view of a structure in which a first layer is formed upon a first substrate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In an embodiment, calibration standards for submicron lateral dimensional metrology may be formed in a number of ways. For example, features of a calibration standard may be formed by deposition and lamination processes. In addition, a thin film or a layer of material of accurate and traceably measured thickness may be used to define a lateral dimension of a feature. A traceably measured layer may be cross-sectioned in a direction substantially perpendicular to an upper surface of the layer. A cross-sectional surface may be used as a viewing surface of the calibration standard. Thus, a traceably measured thickness of a layer may be substantially equal to a lateral dimension artifact of a calibration standard. The viewing surface may also be examined such that differences between layers of material may be observed. The calibration standard may also be etched to create topographic features such as lines and spaces. In this manner, topographic features of the calibration standard may have a traceably measured lateral dimension. Such topographic features may also be more representative of features formed during a semiconductor fabrication process and measured with a calibrated lateral dimensional measurement system than topographic features of currently available calibration standards.

Substantially pure layers may be formed on a first substrate. In addition, layers having a substantially planar upper surface may also be formed on a first substrate. In this manner, the layers may have a substantially uniform thickness over a surface area of the layers. The layers may have a thickness of approximately an atomic monolayer to approximately 2000 nm. For example, such layers may be formed using standard thin film deposition equipment that may be configured to use a technique such as oxidation, chemical vapor deposition ("CVD"), evaporation, sputtering, and molecular beam epitaxy ("MBE"). Thickness metrology techniques having high accuracy and traceability to NIST may be used to measure a thickness of the layers. Such thickness metrology techniques may include, for example, optical ellipsometry, optical spectrophotometry, optical interferometry, profilometry, energy dispersive X-ray spectroscopy ("EDS"), thermal and acoustic wave techniques, cross-sectional TEM, and X-ray techniques. Cross sectioning and polishing processes may expose the structure of the deposited or laminated layers for examination. Furthermore, all of the techniques and processes described above may be currently available and inexpensive and may provide highly accurate lateral dimensional calibration standards having lateral dimensions below approximately 100 nm.

An additional advantage of such a calibration standard may include that a cross-sectioned surface of the calibration standard may be processed using a variety of techniques. For example, a layer of material of the calibration standard may be removed to a known depth below the cross-sectioned surface. As such, a calibration standard as described above may have a viewing surface which may be substantially planar or substantially non-planar. Thus, a feature such as a line of known width and height may be formed by removing material surrounding a layer of material of the calibration standard. Alternatively, spaces or trenches of known width and height may be formed by removing a layer of material below the cross-sectioned surface and leaving surrounding layers of material substantially intact. In addition, a combination of etch and deposition steps may be used to form a plurality of different features within a cross-sectioned surface of a calibration standard. Such a combination of features within a calibration standard may provide advantages for calibration of a lateral dimensional measurement system. For example, alternating layers of different materials may be used to form a repetitive pitch grating within a calibration standard.

Turning now to the drawings, FIG. 1 illustrates a schematic cross-sectional view of an embodiment of structure 10 in which layer 12 may be formed upon first substrate 14. The first substrate may preferably be a semiconductor such as silicon. For example, the first substrate may be a silicon substrate, which may be commonly referred to as a silicon "wafer." Appropriate substrates may also include silicon germanium, gallium arsenide, glass, and quartz. Layer 12 may include polysilicon, metals, dielectrics, and any combination thereof. For example, layer 12 may include a dielectric layer such as a thermally grown silicon dioxide. A thermally grown silicon dioxide may be formed using any method known in the art. For example, a thermal oxidation furnace may be used to thermally grow a silicon dioxide.

Layer 12 may also include a dielectric layer such as deposited silicon dioxide. For example, silicon dioxide may be formed by chemical vapor deposition ("CVD") using a silicon source such as a silane source or a tetraethyloxysilane ("TEOS") source. Alternatively, layer 12 may include a silicon dioxide insulating layer formed below the surface of first substrate 14 using a SIMOX process, as described above. Layer 12 may also include silicon nitride ($Si_xN_y$), silicon oxynitride ($SiO_xN_y(H_z)$), nitrided silicon dioxide, silicon oxynitride, and silicon dioxide/silicon nitride/silicon dioxide (ONO). Alternatively, layer 12 may include a doped dielectric material such as borophosphosilicate glass ("BPSG"), phosphosilicate glass ("PSG"), and fluorinated silicate glass ("FSG"). Additionally, layer 12 may include a low-permittivity ("low-k") dielectric such as fluorine-doped silicon dioxide. In addition, layer 12 may include a high-permittivity ("high-k") dielectric such as tantalum pentoxide ($Ta_2O_5$), barium titanate ($BaTiO_3$), and titanium oxide ($TiO_2$). An appropriate material for layer 12, however, may also include any material which may be deposited with relatively good uniformity.

In addition, layer 12 may include a conductive material such as aluminum, polysilicon, silicon, copper, titanium, tungsten, titanium-tungsten alloys, titanium nitride, and chromium. Such materials may be formed using any method known in the art such as pyrolysis of triisobutyl aluminum ("TIBA"), sputtering, evaporation, chemical vapor deposition of silicon from a silane source, and physical vapor deposition ("PVD"). Furthermore, layer 12 may include any thin film material known in the art.

Layer 12 may have a thickness of less than approximately 500 nm. For example, layer 12 may have a thickness of approximately 10 nm to approximately 250 nm or less than approximately 100 nm. The thickness of layer 12 may be traceably measured using a measurement system such as a spectroscopic ellipsometer. A description of ellipsometry is presented by Harland G. Tompkins in "A user's guide to ellipsometry," Academic Press, Inc., San Diego, Calif. 1993, which is incorporated by reference as if fully set forth herein. Examples of spectroscopic ellipsometers are illustrated in U.S. Pat. Nos. 5,042,951 to Gold et al., 5,412,473 to Rosencwaig et al., 5,581,350 to Chen et al., 5,596,406 to Rosencwaig et al., 5,596,411 to Fanton et al., 5,771,094 to Carter et al., 5,798,837 to Aspnes et al., 5,877,859 to Aspnes et al., 5,889,593 to Bareket et al., 5,900,939 to Aspnes et al., 5,917,594 to Norton and 5,973,787 to Aspnes et al., and are incorporated by reference as if fully set forth herein. Additional examples of spectroscopic devices are illustrated in PCT Application No. WO 99/02970 to Rosencwaig et al., and is incorporated by reference as if fully set forth herein. A measurement system used to measure a thickness of layer 12 may also include any system calibrated with a standard reference material traceable to NIST or another national testing authority. For example, appropriate measurement systems may be configured to measure a thickness of layer 12 using a technique such as ellipsometry, spectrophotometry, optical interferometry, profilometry, EDS, thermal and acoustic wave techniques, cross-sectional TEM, and X-ray techniques. The thickness of layer 12 may be traceably measured in this manner because the thickness of layer 12 may be approximately equal to a lateral dimensional artifact of a calibration standard formed by subsequent steps. In this manner, all necessary steps should be taken to substantially eliminate measurement uncertainty.

Figure 2:
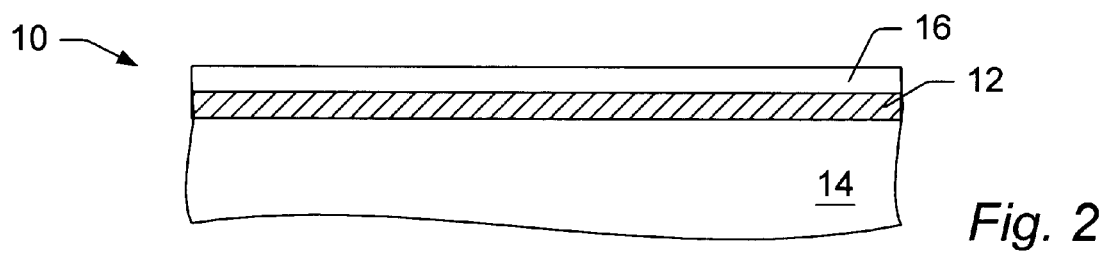
FIG. 2 depicts a partial cross-sectional view of a structure in which a second layer is formed upon the first layer subsequent to FIG. 1.

FIG. 2 illustrates layer 16 formed upon layer 12. Layer 16 may include any of the materials as described herein and may be deposited using any of the techniques as described herein. Layer 16 may also include any material which may have a substantially different etch response than layer 12. For example, layer 16 may include a dielectric material that may have a substantially different etch response than a dielectric material of layer 12. Layer 16 may have a thickness of less than approximately 2000 nm, or approximately 10 nm to approximately 250 nm. For example, an appropriate thickness of layer 16 may be less than approximately 100 nm. In addition, layer 16 may have a thickness which may be substantially equal to a thickness of layer 12. Many of the measurement techniques described above may be used to traceably measure a thickness of layer 16. For example, spectroscopic ellipsometry may be used to measure a thickness of a film, which may be formed upon buried layers such as layer 12, and in particular a buried layer having a previously determined thickness. In addition, a thickness of layer 16 may be measured using any of the techniques as described above.

Figure 3:
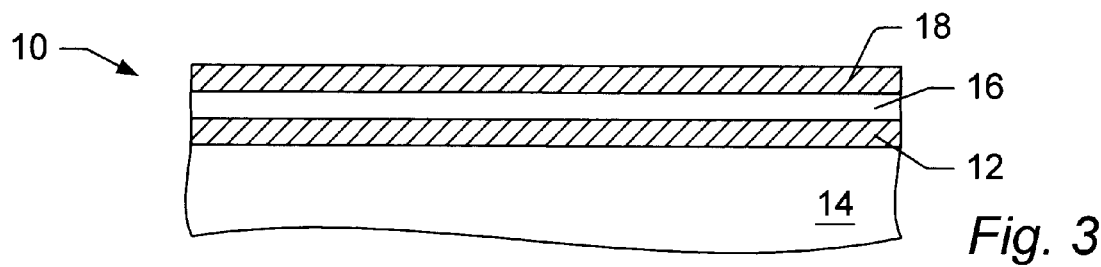
FIG. 3 depicts a partial cross-sectional view of a structure in which a third layer is formed upon the second layer subsequent to FIG. 2.

FIG. 3 illustrates layer 18 formed upon layer 16. Layer 18 may be formed by any of the techniques as described herein. Layer 18 may include any of the materials described above. Appropriate materials for layer 18 may include also any material which may have an etch response which may be substantially different than an etch response of layer 16. For example, layer 18 may include a conductive material that may have a substantially different etch response than a conductive material of layer 16. Appropriate materials for layer 18 may further include any material which may have an etch response that may be substantially equal to an etch response of layer 12. For example, layer 18 may include a dielectric material that may have an etch response which may be approximately equal to an etch response of a dielectric material of layer 12.

Layer 18 may also have a thickness of less than approximately 2000 nm. For example, layer 18 may have a thickness of approximately 10 nm to approximately 250 nm, or less than approximately 100 nm. The thickness of layer 18 may be accurately measured using a measurement system such as a spectroscopic ellipsometer or any of the measurement systems described above. As described above, the measurement system may be calibrated with a standard reference material traceable to NIST or another national testing authority. The thickness of layer 18 may also be accurately measured because the thickness of this layer may be approximately equal to a width of a lateral dimensional artifact of a calibration standard. In this manner, all necessary steps should be taken to substantially eliminate measurement uncertainty. In addition, layer 18, layer 16, and layer 12 may have approximately equal thicknesses. Alternatively, layer 18, layer 16, and layer 12 may have substantially different thicknesses.

Figure 4:
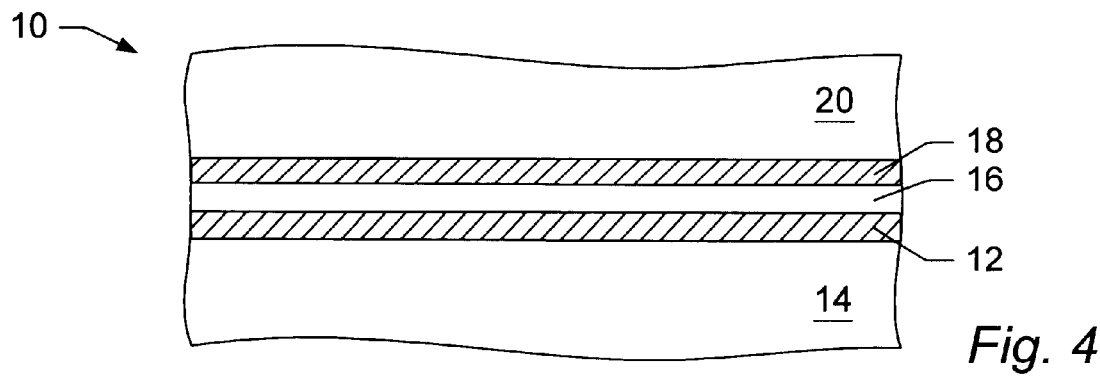
FIG. 4 depicts a partial cross-sectional view of a structure in which a second substrate is bonded to the third layer subsequent to FIG. 3.

FIG. 4 illustrates second substrate 20 bonded to layer 18. For example, second substrate 20 may be bonded to layer 18 by fusion bonding, anodic bonding, or diffusion bonding. In this manner, a chemical bond may be formed between layer 18 and second substrate 20. Second substrate 20 may include a semiconductor such as silicon. For example, second substrate 20 may be a silicon substrate, which may be commonly referred to as a silicon "wafer." Appropriate semiconductor substrates may also include silicon germanium, gallium arsenide, glass, and quartz. In this manner, structure 10 may have a higher mechanical integrity due to second substrate 20. In addition, layer 12, layer 16, and layer 18 may be supported between the first and the second substrates during subsequent processing.

Figure 5:
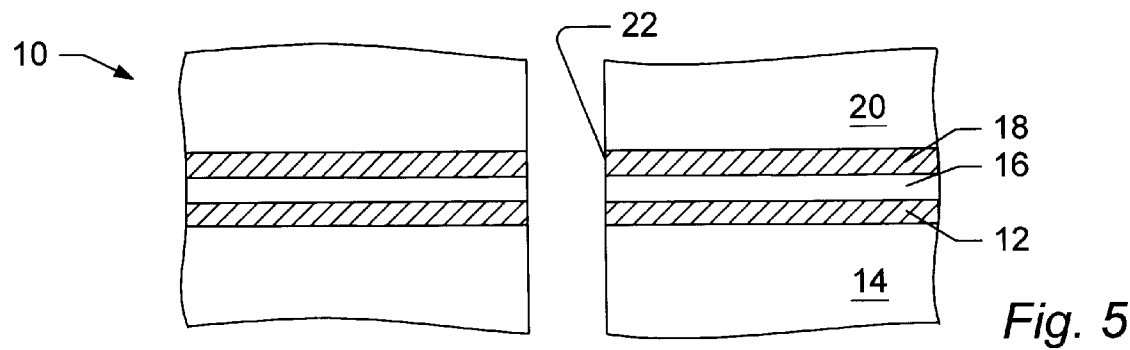
FIG. 5 depicts a partial cross-sectional view of a structure in which the structure is cross-sectioned in a direction substantially perpendicular to an upper surface of the first substrate subsequent to FIG. 4.

FIG. 5 illustrates structure 10 cross-sectioned in a direction substantially orthogonal to at least an upper surface of first substrate 14. For example, structure 10 may be cross-sectioned or cut using a diamond saw to expose cross-sectional surface 22. Alternative techniques for cutting structure 10 may include cleaving, ion beam milling, and etching. Such cross-sectioning of structure 10 may expose the structure of the deposited or laminated layers for additional processing or examination.

Subsequent processing of structure 10 may include removing topographic roughness and residue remaining on cross-sectional surface 22 from the cross-sectioning of structure 10. Residue may be removed by a process such as an etch process, a milling process, a mechanical polishing process, or a chemical-mechanical polishing process. For example, an etch process may include a wet etch process in which the structure may be exposed to liquid etchants. Alternatively, an etch process may include a dry etch process in which the structure may be exposed to a plasma. The liquid etchants and the plasma may be selected to remove any residue remaining on cross-sectional surface 22. In this manner, cross-sectional surface 22 may be substantially planar. In addition, such subsequent processing of structure 10 may expose the structure of the deposited or laminated layers for additional processing or examination.

Additional processing or examination may include measuring a thickness of the deposited or laminated layers using a traceable measurement technique. For example, appropriate traceable measurement techniques may include, but may not be limited to, cross-sectional TEM and atomic lattice counting, as described above. In addition, a thickness of the deposited or laminated layers may be measured using scanning electron microscopy. Furthermore, additional processing or examination may include removing a portion of first substrate 14 and/or second substrate 20 extending from cross-sectional surface 22. In this manner, a thickness of the deposited or laminated layers may be measured using a traceable measurement technique such as, but not limited to, ellipsometry.

Figure 6:
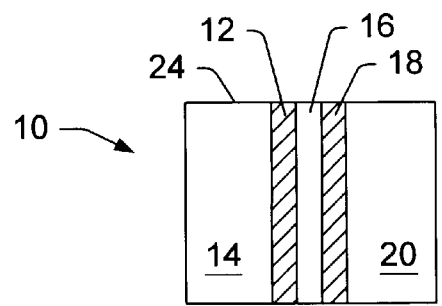
FIG. 6 depicts a partial cross-sectional view of a structure in which the structure is rotated such that the upper surface of the first substrate is substantially perpendicular to a viewing direction of a lateral dimensional metrology system subsequent to FIG. 5.

In addition, subsequent processing may also include mounting the structure in a manner suitable for incorporation into a measurement system to be calibrated. For example, structure 10 may be rotated, as shown in FIG. 6, such that cross-sectional surface 22, as shown in FIG. 5, may be viewing surface 24 of a calibration standard. In this manner, structure 10 may be substantially orthogonal to a viewing direction of the measurement system. In addition, viewing surface 24 may be substantially planar as described above. Furthermore, mounting procedures may ensure that viewing surface 24 may be mounted accurately with respect to the measurement system such that the viewing direction may be substantially orthogonal to the cross-sectional surface to avoid directional cosine error in visualizing the calibrated width surface. Alternatively, structure 10 may be mounted such that the viewing direction may be at a known angle with respect to the cross-sectional surface such that a direction cosine correction factor may be utilized.

Structure 10, as shown in FIG. 6, may be used as a calibration standard for a measurement system. Lateral dimensional artifacts of the calibration standard may include at least one layer such as layer 12, layer 16, and layer 18. Calibration of a measurement system may include measuring a lateral dimensional artifact of the calibration standard and altering calibration factors of the measurement system such that the system may measure the lateral dimensional artifact correctly. For example, calibration factors of the measurement system may be altered if the measured lateral dimension is not substantially equal to the traceably measured thickness of the layer used to form the lateral dimensional artifact. In addition, by measuring lateral dimensional artifacts of the calibration having a variety of lateral dimensions, measurement system linearity may also be determined and/or altered.

Figure 7:
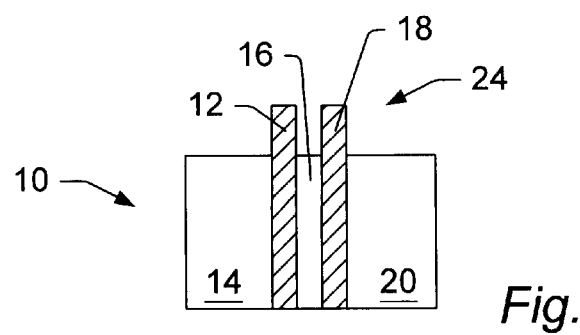
FIG. 7 depicts a partial cross-sectional view of a structure in which a portion of the first and second substrates and a portion of the second layer are removed subsequent to FIG. 6.
Figure 8:
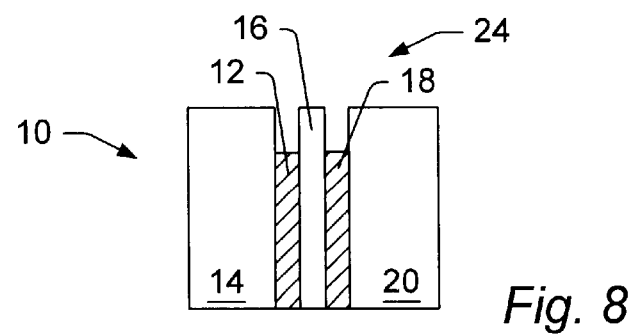
FIG. 8 depicts a partial cross-sectional view of a structure in which a portion of the first and third layers are removed subsequent to FIG. 6.

Alternatively, an etch or milling process may be used to remove a portion of structure 10 from viewing surface 24. In this manner, viewing surface 24 may be substantially non-planar as shown in FIGS. 7 and 8. In addition, a portion of at least one layer or semiconductor substrate may be removed to form topographic features of traceably measured lateral dimensions. For example, layers 12 and 18 may include silicon dioxide, and layer 16 may include silicon. In addition, first and second substrates 14 and 20 may include silicon. Therefore, structure 10 may include two silicon dioxide layers. Each of the silicon dioxide layers may be disposed between silicon layers. As such, an etch process which may involve exposing the structure to a silicon etchant solution may be used to remove a portion of silicon layers 14, 16, and 20. For example, such an etch process may remove each silicon layer to approximately 1 μm below viewing surface 24 while leaving silicon dioxide layers 12 and 18 substantially intact. As shown in FIG. 7, subsequent to such an etch process, silicon dioxide layers 12 and 18 extending above remaining portions of silicon layers 14, 16, and 20 may form silicon dioxide lines. The formed silicon dioxide lines may have a height of approximately one micron. The formed silicon dioxide lines may also have a traceably measured width of less than approximately 500 nm. More preferably, the formed silicon dioxide lines may also have a traceably measured width of less than approximately 100 nm. In addition, due to the selectivity of such an etch process, the silicon dioxide lines may have substantially vertical sidewalls.

Alternatively, an etch process which may involve exposing the structure to a Buffered Oxide Etch ("BOE") solution may be used to remove a portion of silicon dioxide layers 12 and 18. For example, such an etch process may remove each silicon dioxide layer to approximately 1 μm below viewing surface 24 while leaving silicon layers 14, 16, and 20 substantially intact. As shown in FIG. 8, subsequent to such an etch process, silicon layers 14, 16, and 20 extending above remaining portions of silicon dioxide layers 12 and 18 may form a trench between silicon layers 14 and 16 and between silicon layers 16 and 20. The formed trenches may have a depth of approximately one micron. The formed trenches may also have a traceably measured width of less than approximately 500 nm. More preferably, the formed trenches may also have a traceably measured width of less than approximately 100 nm. In addition, due to the selectivity of such an etch process, the formed trenches may have substantially vertical sidewalls.

Appropriate etch processes which may be used to remove a portion of the structure, however, may vary depending on the materials of first substrate 14, layer 12, layer 16, layer 18, and second substrate 20. Appropriate etch processes which may be used to remove a portion of the structure may also vary depending on a thickness of the removed portion of a semiconductor substrate or layer of the structure.

A lateral dimension of a feature such as a line or a space subsequent to an etch process may be different than a lateral dimension of the feature prior to the etch process. Therefore, variation in a lateral dimension of a feature may be measured and corrected for in a nominal value of the lateral dimension subsequent to an etch process. In addition, systematic atmospheric growth phenomena such as the growth of native oxide on an exposed silicon surface may alter a lateral dimension of features over time. As such, variation in a lateral dimension of a feature may be measured and corrected for in a nominal value for the lateral dimension over time.

Applications for a calibration standard formed by such simple processing techniques may be numerous. For example, materials which may be included in structure may vary depending upon a semiconductor fabrication process which the calibration standard may be designed to simulate. In an example, silicon dioxide layers surrounding a chromium layer may be used to simulate features which may be formed on a surface of a photomask. A photomask may be a mask which may be disposed above a resist and may have substantially transparent regions and substantially opaque regions which may be configured in a pattern which may be transferred to the resist. In addition, successive layers of silicon and silicon dioxide may be used to simulate a pitch grating of traceably measured lateral dimensions. Furthermore, additional processing of a cross-sectional surface or a viewing surface may include deposition of additional surface coatings. Additional surface coatings may protect or modify the cross-sectional surface to increase the utility and/or durability of the calibration standard.

Figure 9:
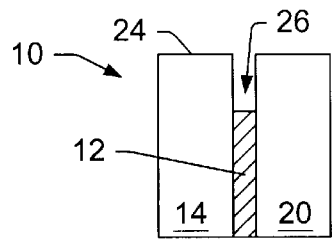
FIG. 9 depicts a partial cross-sectional view of a structure in which a layer is formed upon a first substrate, a second substrate is bonded to the layer, the structure is cross-sectioned in a direction substantially perpendicular to an upper surface of the first substrate, the layer is partially etched, and the structure is rotated such that the upper surface of the first substrate is substantially perpendicular to a viewing direction of a lateral dimensional metrology system.

FIG. 9 illustrates an additional embodiment of structure 10 in which layer 12 may be formed upon first substrate 14. First substrate 14 may include any of the materials as described in above embodiments. Layer 12 may include any of the materials as described herein and may be formed by any of the processes as described herein. In addition, layer 12 may have a traceably measured thickness of less than approximately 2000 nm, and more preferably a traceably measured thickness of less than approximately 100 nm. A thickness of layer 12 may be traceably measured as described in any of the above embodiments. In addition, second substrate 20 may be bonded to layer 12. Second substrate 20 may also include any of the materials as described in above embodiments. As such, structure 10 may include at least one layer disposed between a first substrate and a second substrate.

As further shown in FIG. 9, structure 10 may be cross-sectioned in a direction substantially perpendicular to an upper surface of first substrate 14 to form a cross-sectional surface. Structure 10 may be cross-sectioned as described in any of the above embodiments. Furthermore, as shown in FIG. 9, structure 10 may be rotated such that an upper surface of first substrate 14 may be substantially perpendicular to a viewing direction of a lateral dimensional metrology system. In this manner, a cross-sectional surface of structure 10 may include viewing surface 24. In addition, structure 10 may be exposed to an etch process to remove a portion of layer 12. The etch process may include any of the etch processes as described in above embodiments. In this manner, trench 26 may be formed in structure 10 below viewing surface 24.

Figure 10:
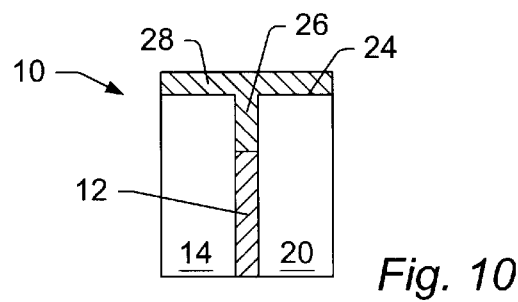
FIG. 10 depicts a partial cross-sectional view of a structure in which a layer is deposited upon a cross-sectional surface of the structure subsequent to FIG. 9.
Figure 11:
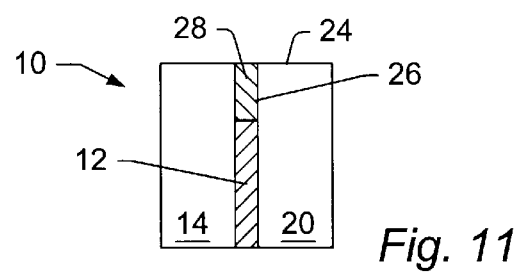
FIG. 11 depicts a partial cross-sectional view of a structure in which the deposited layer is planarized subsequent to FIG. 10.

FIG. 10 illustrates layer 28 formed upon viewing surface 24 and within trench 26 of structure 10. Layer 28 may include a material which may be substantially different than a material of layer 12. For example, layer 12 may include a silicon dioxide which may be thermally grown or deposited as described in above embodiments. In this manner, layer 28 may include a conductive material such as aluminum and polysilicon which may be deposited using a technique such as sputtering. As shown in FIG. 11, layer 28 may be polished to remove portions of layer 28 formed upon viewing surface 24. Polishing, or planarizing, of layer 28 may include mechanical polishing or chemical-mechanical polishing as described in above embodiments. In this manner, layer 28 remaining in trench 26 may be substantially coplanar with viewing surface 24. In addition, as shown in FIG. 11, viewing surface 24 may include a substantially planar surface which may include different materials. For example, layer 28 may include a conductive material such as aluminum having a lateral dimension which may be approximately equal to the traceably measured thickness of layer 12. In addition, first and second substrates 14 and 20 surrounding layer 28 may include silicon. The different materials may have different optical, thermal, electrical, and/or acoustic properties. As such, structure 10, as shown in FIG. 11, may be used as a calibration standard for a lateral dimensional measurement system.

Figure 12:
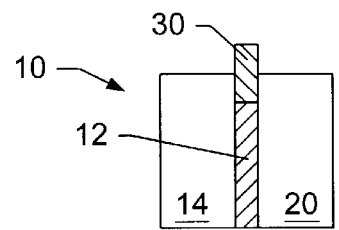
FIG. 12 depicts a partial cross-sectional view of a structure in which portions of the first and second substrates are removed subsequent to FIG. 11.

In addition, a portion of first substrate 14 and second substrate 20 extending from viewing surface 24 may be removed, as shown in FIG. 12, subsequent to planarization of layer 28. Portions of first substrate 14 and second substrate 20 may be removed using any of the processes as described herein. In this manner, portion 30 of layer 28 extending above upper surfaces of remaining portions of first substrate 14 and second substrate 20 may form a topographic feature of the calibration standard such as a line.

Figure 13:
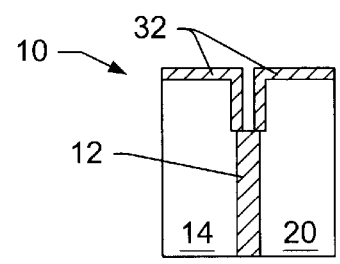
FIG. 13 depicts a partial cross-sectional view of a structure in which an oxide layer is formed upon exposed surfaces of the first and second substrates subsequent to FIG. 9.

FIG. 13 illustrates layer 32 formed upon viewing surface 24 and within trench 26 of structure 10 subsequent to FIG. 9. Layer 32 may include thermally grown silicon dioxide which may be formed by oxidizing first substrate 14 and second substrate 20. As such, layer 32 may be formed upon exposed silicon surfaces of structure 10. For example, a thermally grown oxide may be formed on upper surfaces of semiconductor substrate 14 and semiconductor substrate 20 and on sidewall surfaces of the trench.

Figure 14:
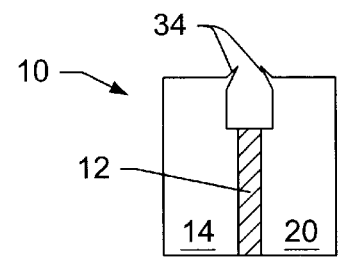
FIG. 14 depicts a partial cross-sectional view of a structure in which the oxide layer is removed subsequent to FIG. 13.

As shown in FIG. 14, layer 32 may be removed by a stripping process such as a wet etch or a dry etch process to form reentrant knife-edge structures 34 at each upper corner of trench 26. Reentrant knife-edge structures 34 may be formed at each upper corner of trench 26 because silicon dioxide growth may be inhibited at each upper corner of the trench. The inhibition of oxidation at corners of silicon may be commonly used to produce sharp silicon tips for field emission or atomic force microscopy. The creation of sharp corners may result because silicon may be consumed in the oxidation process to form silicon dioxide, and less silicon may be consumed at a corner because oxidation on forming on the two surfaces which may form the corner may prevent additional silicon dioxide to form at the corner.

Figure 15:
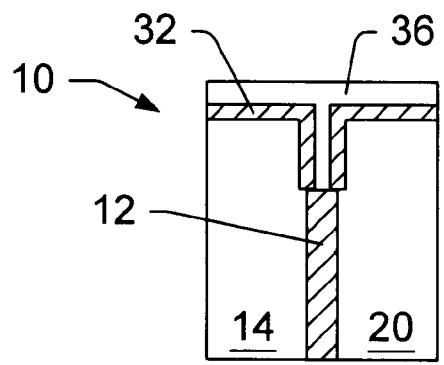
FIG. 15 depicts a partial cross-sectional view of a structure in which a conductive layer is deposited upon the oxide layer subsequent to FIG. 13.
Figure 16:
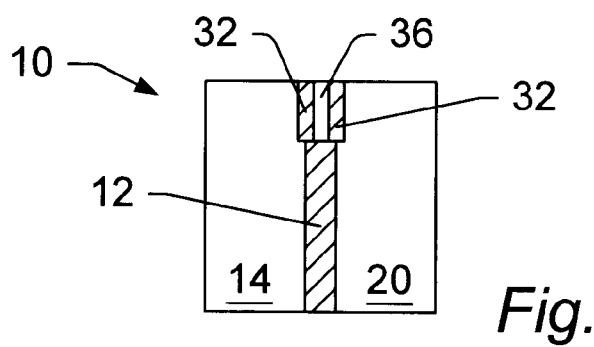
FIG. 16 depicts a partial cross-sectional view of a structure in which the conductive layer and the oxide layer are planarized subsequent to FIG. 15.

FIG. 15 illustrates layer 36 formed upon layer 32 and within trench 26 of structure 10 subsequent to FIG. 13. Layer 36 may also include a material which may be substantially different than a material of layer 32. For example, layer 32 may include a silicon dioxide which may be thermally grown or deposited as described in above embodiments. In this manner, layer 36 may include a conductive material such as aluminum and polysilicon or another suitable metal which may be deposited using a sputtering technique. Layer 36 may be also formed as described in above embodiments. As shown in FIG. 16, layer 36 and layer 32 may be polished to remove portions of layer 36 and layer 32 formed upon viewing surface 24. Polishing of layer 36 and layer 32 may include mechanical polishing or chemical-mechanical polishing as described in above embodiments. In this manner, layer 36 and layer 32 remaining in trench 36 may be substantially coplanar with viewing surface 24.

Figure 17:
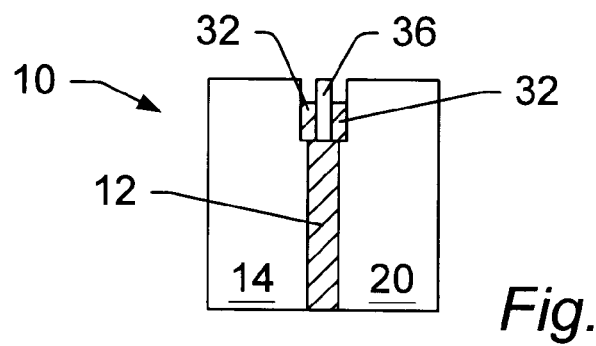
FIG. 17 depicts a partial cross-sectional view of a structure in which a portion of the oxide layer is removed subsequent to FIG. 16.

As further shown in FIG. 16, viewing surface 24 may include a substantially planar surface which may include different materials. For example, layer 36 may include a conductive material and layer 32 may include silicon dioxide. The different materials may have different optical, thermal, electrical, and/or acoustic properties. A thickness of each of the different material layers may be determined using a traceable measurement technique as described herein. As such, structure 10, as shown in FIG. 16, may be used as a calibration standard for a lateral dimensional measurement system. Alternatively, structure 10 may be used as a calibration standard subsequent to additional processing. For example, as shown in FIG. 17, a portion of layer 32 may be removed to form trenches below viewing surface 24. The portion of layer 32 may be removed as described herein. Alternatively, a portion of layer 36 may be removed to form a line below viewing surface 24. In addition, a thickness of each of the different material layers may be determined using a traceable measurement technique as described herein subsequent to such additional processing. Such a calibration standard may be used to simulate features which may be formed on a reticle or on a silicon wafer.

It will be appreciated to those skilled in the art having the benefit of this disclosure that this invention is believed to provide submicron dimensional calibration standards and methods of manufacture and use. Further modifications and alternative embodiments of various aspects of the invention will be apparent to those skilled in the art in view of this description. For example, the calibration standards and methods may also be used to measure a property of a conductive layer such as a silicide and an epitaxial layer of silicon. It is intended that the following claims be interpreted to embrace all such modifications and changes and, accordingly, the specification and drawings are to be regarded in an illustrative rather than a restrictive sense.

What is claimed is:

1. A calibration standard, comprising:
    a first substrate spaced from a second substrate; and
    at least one layer disposed between the first and second substrates, wherein the at least one layer comprises a traceably measured thickness, wherein a viewing surface of the calibration standard comprises a cross-sectional surface of the calibration standard, and wherein the cross-sectional surface is substantially perpendicular to an upper surface of at least the first substrate such that a lateral dimensional artifact of the calibration standard comprises the traceably measured thickness of the at least one layer.

2. The standard of claim 1, wherein the traceably measured thickness comprises less than approximately 500 nm.

3. The standard of claim 1, wherein the traceably measured thickness is determined using a traceable measurement technique, and wherein the traceable measurement technique comprises thin film metrology.

4. The standard of claim 1, wherein the traceably measured thickness is determined using a traceable measurement technique, and wherein the traceable measurement technique comprises ellipsometry.

5. The standard of claim 1, wherein the traceably measured thickness is determined using a traceable measurement technique, and wherein the traceable measurement technique comprises spectrophotometry.

6. The standard of claim 1, wherein the traceably measured thickness is determined using a traceable measurement technique, and wherein the traceable measurement technique comprises interferometry.

7. The standard of claim 1, wherein the traceably measured thickness is determined using a traceable measurement technique, and wherein the traceable measurement technique comprises profilometry.

8. The standard of claim 1, wherein the traceably measured thickness is determined using a traceable measurement technique, and wherein the traceable measurement technique comprises cross-sectional TEM.

9. The standard of claim 1, wherein the traceably measured thickness is determined with a measurement system calibrated with a standard reference material traceable to a national testing authority.

10. The standard of claim 1, wherein the viewing surface is substantially planar.

11. The standard of claim 1, wherein the viewing surface is substantially non-planar.

12. The standard of claim 1, wherein a portion of the at least one layer extending from the cross-sectional surface is removed to form a trench in the calibration standard.

13. The standard of claim 1, wherein a portion of the first and second substrates extending from the cross-sectional surface is removed such that the at least one layer forms a topographic feature of the calibration standard, and wherein the topographic feature comprises a line.

14. The standard of claim 1, wherein the at least one layer is formed within a trench of the calibration standard, and wherein reentrant knife-edge structures are formed at upper corners of the trench.

15. The standard of claim 1, wherein the at least one layer comprises a material of a feature formed by a semiconductor fabrication process, and wherein a lateral dimension of the feature is to be measured with a lateral dimensional measurement system calibrated with the calibration standard.

16. The standard of claim 1, wherein the traceably measured thickness is approximately equal to a lateral dimension of a feature formed by a semiconductor fabrication process, and wherein the lateral dimension of the feature is to be measured with a lateral dimensional measurement system calibrated with the calibration standard.

17. The standard of claim 1, further comprising at least three layers disposed between the first and second substrates, wherein the at least three layers comprise at least one feature of the calibration standard.

18. The standard of claim 1, further comprising at least three layers disposed between the first and second substrates, wherein the at least three layers comprise at least a first feature and a second feature, and wherein a traceably measured thickness of the first feature is approximately equal to a traceably measured thickness of the second feature.

19. The standard of claim 1, further comprising at least three layers disposed between the first and second substrates, wherein the at least three layers comprise at least a first feature and a second feature, and wherein a traceably measured thickness of the first feature is substantially different than a traceably measured thickness of the second feature.

20. The standard of claim 1, wherein the first substrate or the second substrate comprises a semiconductor.

21. The standard of claim 1, wherein the first substrate or the second substrate comprises quartz.

22. The standard of claim 1, wherein the first substrate or the second substrate comprises glass.

23. A method for forming a calibration standard, comprising:
    forming at least one layer upon an upper surface of a first substrate;
    determining a thickness of the at least one layer using a traceable measurement technique;
    bonding a second substrate to an upper surface of the at least one layer; and
    cross-sectioning the first substrate, the at least one layer, and the second substrate in a plane substantially perpendicular to at least the upper surface of the first substrate to form a viewing surface of the calibration standard such that a lateral dimensional artifact of the calibration standard comprises the determined thickness of the at least one layer.

24. The method of claim 23, wherein the determined thickness comprises less than approximately 500 nm.

25. The method of claim 23, wherein the traceable measurement technique comprises thin film metrology.

26. The method of claim 23, wherein the traceable measurement technique comprises ellipsometry.

27. The method of claim 23, wherein the traceable measurement technique comprises spectrophotometry.

28. The method of claim 23, wherein the traceable measurement technique comprises interferometry.

29. The method of claim 23, wherein the traceable measurement technique comprises profilometry.

30. The method of claim 23, wherein the traceable measurement technique comprises cross-sectional TEM.

31. The method of claim 23, wherein determining the thickness of the at least one layer comprises calibrating a measurement system with a standard reference material traceable to a national testing authority.

32. The method of claim 23, further comprising planarizing the cross-sectioned first substrate, the at least one layer, and second substrate such that the viewing surface is substantially planar.

33. The method of claim 23, further comprising removing a portion of the first substrate, the at least one layer, and the second substrate extending from the viewing surface such that the viewing surface is substantially non-planar.

34. The method of claim 23, further comprising removing a portion of the first and second substrates extending from the viewing surface such that the at least one layer forms a topographic feature of the calibration standard, and wherein the topographic feature comprises a line.

35. The method of claim 23, further comprising removing a portion of the at least one layer extending from the viewing surface to form a trench in the calibration standard.

36. The method of claim 23, further comprising forming a thermally grown oxide on upper surfaces of the first and second substrates and on sidewall surfaces of a trench formed in the calibration standard.

37. The method of claim 36, further comprising removing the thermally grown oxide to form reentrant knife-edge structures at upper corners of the trench.

38. The method of claim 36, further comprising depositing a material on the thermally grown oxide and planarizing the deposited material and the thermally grown oxide such that upper surfaces of the thermally grown oxide and the deposited material are substantially planar with upper surfaces of the first and second substrates.

39. The method of claim 38, further comprising determining a thickness of at least the thermally grown oxide or the deposited material using a traceable measurement technique.

40. The method of claim 38, further comprising removing a portion of the thermally grown oxide to form trenches in the calibration standard.

41. The method of claim 23, wherein the at least one layer comprises a material of a feature formed by a semiconductor fabrication process, and wherein a lateral dimension of the feature is to be measured with a lateral dimensional measurement system calibrated with the calibration standard.

42. The method of claim 23, wherein the determined thickness of the at least one layer comprises approximately a lateral dimension of a feature formed by a semiconductor fabrication process, and wherein the lateral dimension of the feature is to be measured with a lateral dimensional measurement system calibrated with the calibration standard.

43. The method of claim 23, wherein the at least one layer comprises at least three layers, and wherein the at least three layers comprise at least one feature of the calibration standard.

44. The method of claim 23, wherein the at least one layer comprises at least three layers, wherein the at least three layers form at least a first feature and a second feature of the calibration standard, and wherein a determined thickness of the first feature is approximately equal to a determined thickness of the second feature.

45. The method of claim 23, wherein the at least one layer comprises at least three layers, wherein the at least three layers form at least a first feature and a second feature of the calibration standard, and wherein a determined thickness of the first feature is substantially different than a determined thickness of the second feature.

46. The method of claim 23, wherein the first substrate or the second substrate comprises a semiconductor.

47. The method of claim 23, wherein the first substrate or the second substrate comprises quartz.

48. The method of claim 23, wherein the first substrate or the second substrate comprises glass.

49. A method for calibrating a lateral dimensional measurement system, comprising:

determining a thickness of at least one layer of a calibration standard with the system, wherein the calibration standard comprises:
a first substrate spaced from a second substrate; and
at least one layer disposed between the first and second substrates, wherein the at least one layer comprises a traceably measured thickness, wherein a viewing surface of the calibration standard comprises a cross-sectional surface of the calibration standard, and wherein the cross-sectional surface is substantially perpendicular to an upper surface of at least the first substrate such that a lateral dimensional artifact of the calibration standard comprises the traceably measured thickness of the at least one layer; and altering calibration factors of the measurement system if the determined lateral dimension is not substantially equal to the lateral dimensional artifact of the calibration standard.

* * * * *

UNITED STATES PATENT AND TRADEMARK OFFICE
CERTIFICATE OF CORRECTION

PATENT NO. : 6,646,737 B2  
DATED : November 11, 2003  
INVENTOR(S) : Tortonese et al.

It is certified that error appears in the above-identified patent and that said Letters Patent is hereby corrected as shown below:

<u>Column 16,</u>  
Line 9, please delete "comers" and substitute therefor -- corners --.

<u>Column 17,</u>  
Line 33, please delete "comers" and substitute therefor -- corners --.

Signed and Sealed this

Thirteenth Day of April, 2004

JON W. DUDAS  
*Acting Director of the United States Patent and Trademark Office*